(12) United States Patent  
Kang et al.

(10) Patent No.: US 7,829,210 B2  
(45) Date of Patent: Nov. 9, 2010

(54) FUEL CELL SYSTEM WITH A CATHODE GAS RECYCLING FUNCTION

(75) Inventors: Ku-Yen Kang, Hsinchu (TW); Pei-Fang Huang, Tainan County (TW); Chiou-Chu Lai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1102 days.

(21) Appl. No.: 11/397,787

(22) Filed: Apr. 4, 2006

(65) Prior Publication Data

US 2006/0234104 A1 Oct. 19, 2006

(30) Foreign Application Priority Data

Apr. 19, 2005 (TW) .............................. 94112394 A

(51) Int. Cl.  
*H01M 2/02* (2006.01)

(52) U.S. Cl. .............................. 429/34; 429/38; 429/32; 429/17

(58) Field of Classification Search .................... 429/34, 429/38, 39, 17, 19, 32  
See application file for complete search history.

(56) References Cited

U.S. PATENT DOCUMENTS

| 6,698,278 | B2 | 3/2004 | Zhang et al. | |
|---|---|---|---|---|
| 2005/0260466 | A1* | 11/2005 | Kobayashi et al. | 429/13 |
| 2006/0105210 | A1* | 5/2006 | Surampudi et al. | 429/22 |
| 2007/0003804 | A1* | 1/2007 | Ogawa | 429/22 |

FOREIGN PATENT DOCUMENTS

| JP | 53-58640 | * | 5/1976 |
|---|---|---|---|
| WO | WO 2004/054029 | * | 6/2004 |

* cited by examiner

*Primary Examiner*—Raymond Alejandro

(57) ABSTRACT

A fuel cell system comprises a fuel cell module, at least a cathode gas supply unit in contact with the cathode, at least one gas delivery unit and at least one anode fuel supply unit in contact with the anode. The fuel cell module comprises at least one fuel cell having one anode and one cathode. The cathode gas supply unit comprises at least one gas input port for receiving cathode gas and at least one gas exit for exhausting the cathode gas. The gas delivery unit guides the cathode gas to the gas input port. The anode fuel supply unit having a fuel comprises at least one fuel input port for receiving a resupplied fuel and at least one cathode gas input port for receiving the cathode gas from the gas exit.

15 Claims, 5 Drawing Sheets

US 7,829,210 B2

FUEL CELL SYSTEM WITH A CATHODE GAS RECYCLING FUNCTION

BACKGROUND OF THE INVENTION

1. Field of the Invention

The present invention relates to a fuel system, and in particular relates to a fuel cell system recycling water directly from a cathode unit to a fuel reaction unit.

2. Description of the Related Art

A fuel cell (FC) is a voltage generator that converts chemical power directly to electrical power. Compared with conventional voltage generators, an FC has many advantages, such as lower pollution, lower noise, higher energy density, higher energy conversion efficiency, and as such FCs are considered to be environmentally friendly. FCs can be applied to portable electronic devices, domestic generators, transportation, military equipment, space industry, and the like.

FC operation varies by type. Take a direct methanol fuel cell (DMFC) for example, a methanol aqueous solution oxidizes in an anode catalyst layer to generate hydrogen ions ($H^+$), electrons ($e^-$), and carbon dioxide ($CO_2$), wherein $H^+$ is delivered to a cathode through an electrolyte, and $e^-$ is delivered to a cathode though external circuit. Oxygen ($O_2$) is provided in a cathode unit, such that $H^+$ reacts with $e^-$ and $O_2$ and forms water ($H_2O$). Conventionally, DMFCs have issues of methanol crossover, i.e. methanol and water molecules in an anode unit cross through the electrolyte to the cathode unit, which affect the efficiency of the fuel cell system. Typically, concentration of the methanol fuel is lower than 10% to reduce crossover, but the power efficiency of the fuel cell system is also reduced. As a result, water at the cathode unit is recycled to the anode unit, and the concentration of methanol fuel is increased, thus increasing the power efficiency of the fuel cell system.

FIG. 1 is a block diagram of a conventional fuel cell system 100. Fuel cell module 111 comprises an anode 120 and a cathode 130. A storage unit 122 stores fuel for reacting with anode 120. The fuel is delivered to the anode unit 121 using pump 123, reacting with anode 120, and recycled to storage unit 122. A gas is delivered to cathode unit 131 using pump 132, cooled by cooler 133, and then exhausted. Water is collected in recycling area 134, and delivered to the storage unit 122 using pump 135. A fuel tank 141 storing high concentration fuel is coupled to storage unit 122, wherein fuel concentration in storage unit 122 can be adjusted by delivering the high concentration fuel to storage unit 122 using pump 142. Three liquid and one air pump, a discrete fuel storage unit, a cooler and a water recycling area are required. The cost and size of the fuel cell are compromised, and not suitable for portable fuel cell design.

U.S. Pat. No. 6,698,278 provides a fuel cell, as shown in FIG. 2. FIG. 2 depicts a fuel cell system 200. Fuel cell module 211 comprises an anode 220 and a cathode 230. A storage unit 222 stores fuel for reacting with anode 220. The fuel is delivered to the anode unit 221 using pump 223, reacting with anode 220, and recycled to storage unit 222. A gas is delivered to cathode unit 231 using pump 232, and then delivered to the storage unit 222. An air exit 224 exhausting gas is located at the storage unit 222. A fuel tank 241 storing high concentration fuel is coupled to storage unit 222, wherein fuel concentration in storage unit 222 can be adjusted by delivering the high concentration fuel to storage unit 222 using pump 242. Although some components are eliminated from fuel system of FIG. 1, there are too many components to achieve a more compact design. Pump 223 must run continuously, which also impacts the power efficiency of the FC system.

BRIEF SUMMARY OF THE INVENTION

The invention provides a method of water recycling for a fuel cell system, guiding a gas to the fuel of an anode fuel supply unit of the fuel cell system directly as the gas passes through a cathode of the fuel cell system.

The invention further provides a fuel cell system comprising a fuel cell module, wherein at least one cathode gas supply unit contacts the cathode, at least one gas delivery unit and at least one anode fuel supply unit contacts the anode. The fuel cell module comprises at least one fuel cell having one anode and one cathode. The cathode gas supply unit comprises at least one gas input port for receiving cathode gas and at least one gas exit for exhausting the cathode gas. The gas delivery unit guides the cathode gas to the gas input port. The anode fuel supply unit having a fuel receives the cathode gas exhausted from the gas exit of the cathode gas supply unit and comprises at least one fuel input port for receiving a resupplied fuel.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
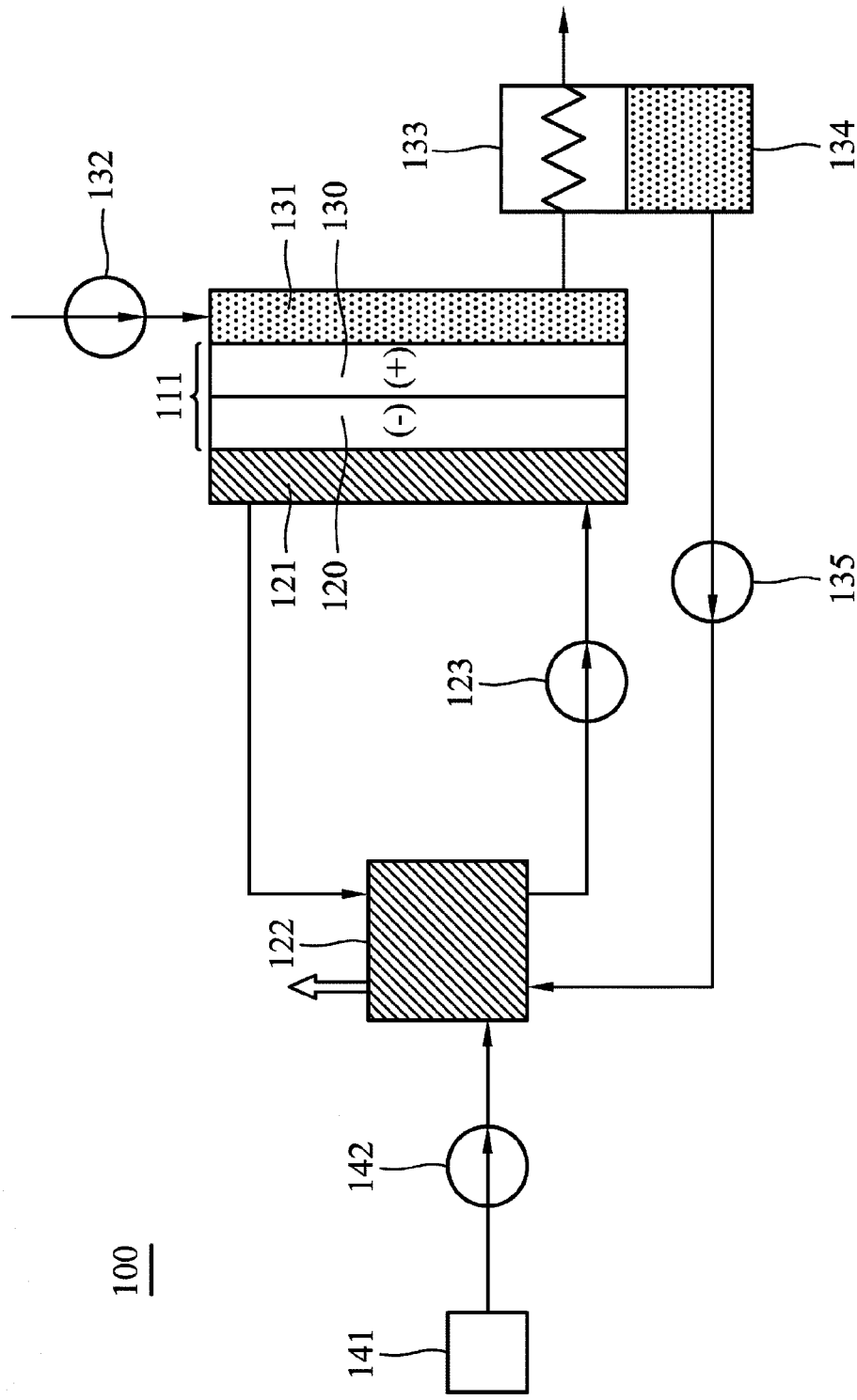
FIG. 1 is a block diagram of a conventional fuel cell system.
Figure 2:
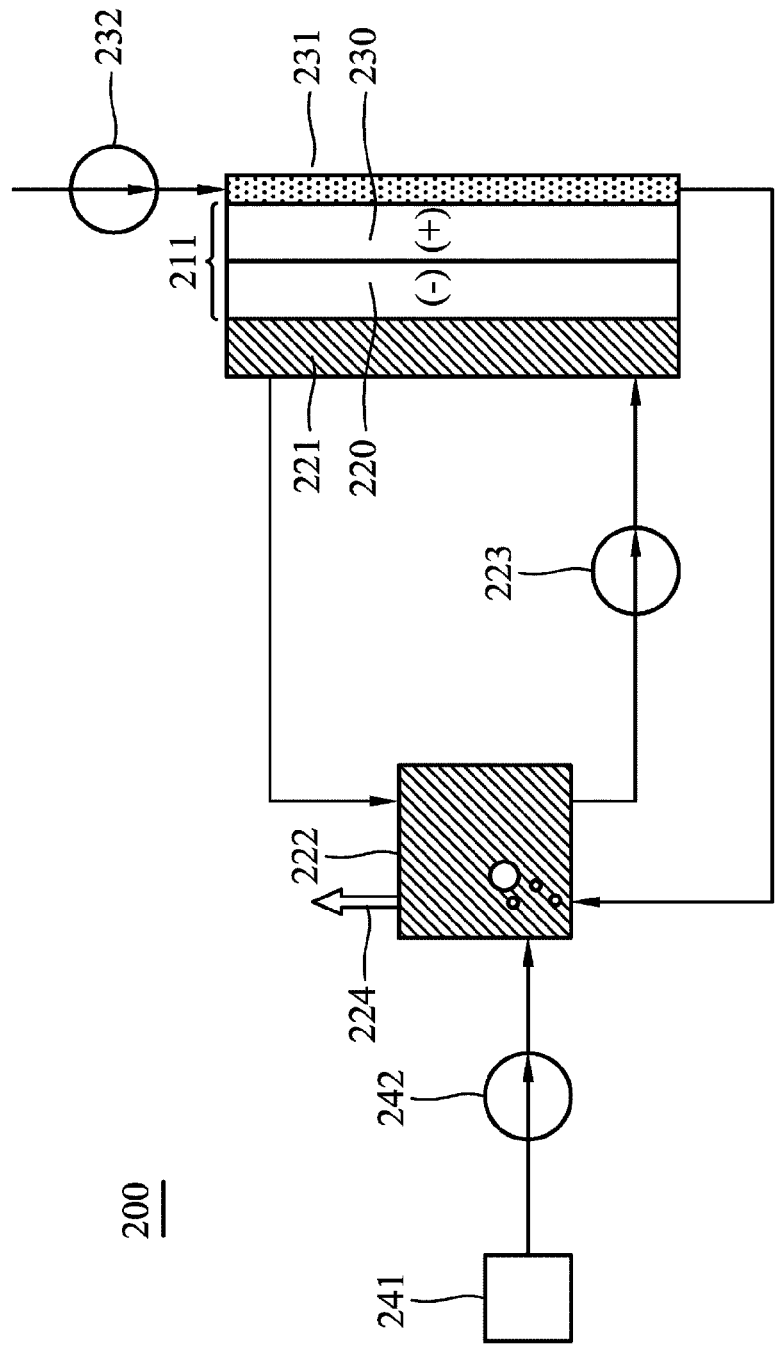
FIG. 2 is a block diagram of a conventional fuel cell system provided by U.S. Pat. No. 6,698,278.
Figure 3:
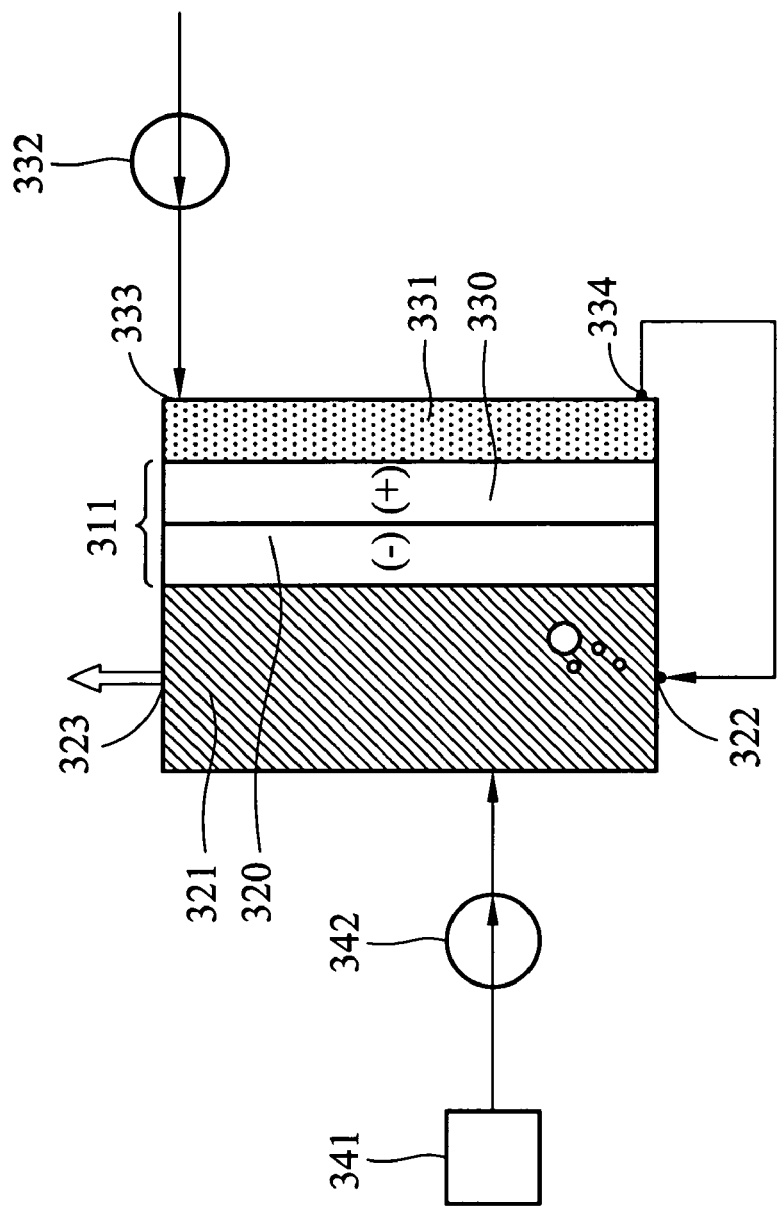
FIG. 3 is a block diagram of a fuel cell system 300 according to a first embodiment of the invention.

FIG. 3 is a block diagram of a fuel cell system 300 according to a first embodiment of the invention. Fuel cell module 311 comprises an anode 320 and a cathode 330. An anode fuel supply unit 321 stores fuel for reacting with anode 320. The gas delivery unit 332 can be an air compressor, a steel cylinder with high-pressure gas, a blower, a pump and so on. The gas delivery unit 332 is coupled to the gas input port 333 to deliver the gas required in the cathode reaction to cathode gas supply unit 331. The cathode further comprises a gas exit 334 coupled to the anode fuel supply unit 321, disposed in a side of the cathode to deliver the gas in the cathode to the fuel supply unit 321. More than one anode gas input port 322 can be implemented in anode fuel supply unit 321 for better reaction. Anode gas input port 322 further comprises a porous material for generating fine air bubbles for better reaction in the fuel supply unit 321 and stirring the fuel for even fuel concentration. The fuel supply unit 321 further comprises an anode gas exit 323 to exhaust the gas generated by the reaction in anode and the gas from the cathode.

The anode gas exit 323 comprises a membrane passing only air and keeps the fuel in anode fuel supply unit 321 for preventing fuel leakage and exhausting gas. A fuel tank 341 storing high concentration fuel is coupled to anode fuel supply unit 321 by a pump 342, wherein fuel concentration in anode fuel supply unit 321 can be adjusted by delivering the high concentration fuel to anode fuel supply unit 321 from a fuel tank 341.

The gas delivery unit 332 can also be implemented between gas exit 334 and anode gas input port 322 for delivering gas to the anode fuel supply unit 321 and guiding the gas into cathode gas supply unit 331 via suction.

The surface of anode 320 within anode fuel supply unit 321 is further covered with a porous material layer to allow passage of the fuel but prevent air from contacting the anode 320 directly, wherein the porous material preferably comprises a hydrophilic material.

A porous device, such as an air stone, a gas-passage film, a gas obstructing device or a gas-pass-only device, built in the anode fuel supply unit 321 increases the contact surface areas of the cathode gas and the fuel and detains the cathode gas for a longer time resulting in better reaction between the cathode gas and the fuel.

A no-return valve built in the gas exit 334 prevents the fuel in the anode fuel supply unit 321 from returning to the cathode gas supply unit 331.

At least one anode gas exit 323 is disposed in different location of the anode fuel supply unit 321 to rapidly exhaust the gas.

The cathode gas supply unit 331 can comprise a humidity detector for measuring humidity within cathode gas supply unit 331 for controlling gas delivering speed into cathode gas supply unit 331.

The gas input port 333 of the cathode gas supply unit 321 further comprises a control valve to stop receiving the gas when the fuel cell system is not in operation.

According to the described embodiment of the invention, the number of fuel delivery devices within a fuel cell system is reduced, and the fuel delivery path is minimized. Not only the providing a more compact design, but also reducing power consumption.

Figure 4:
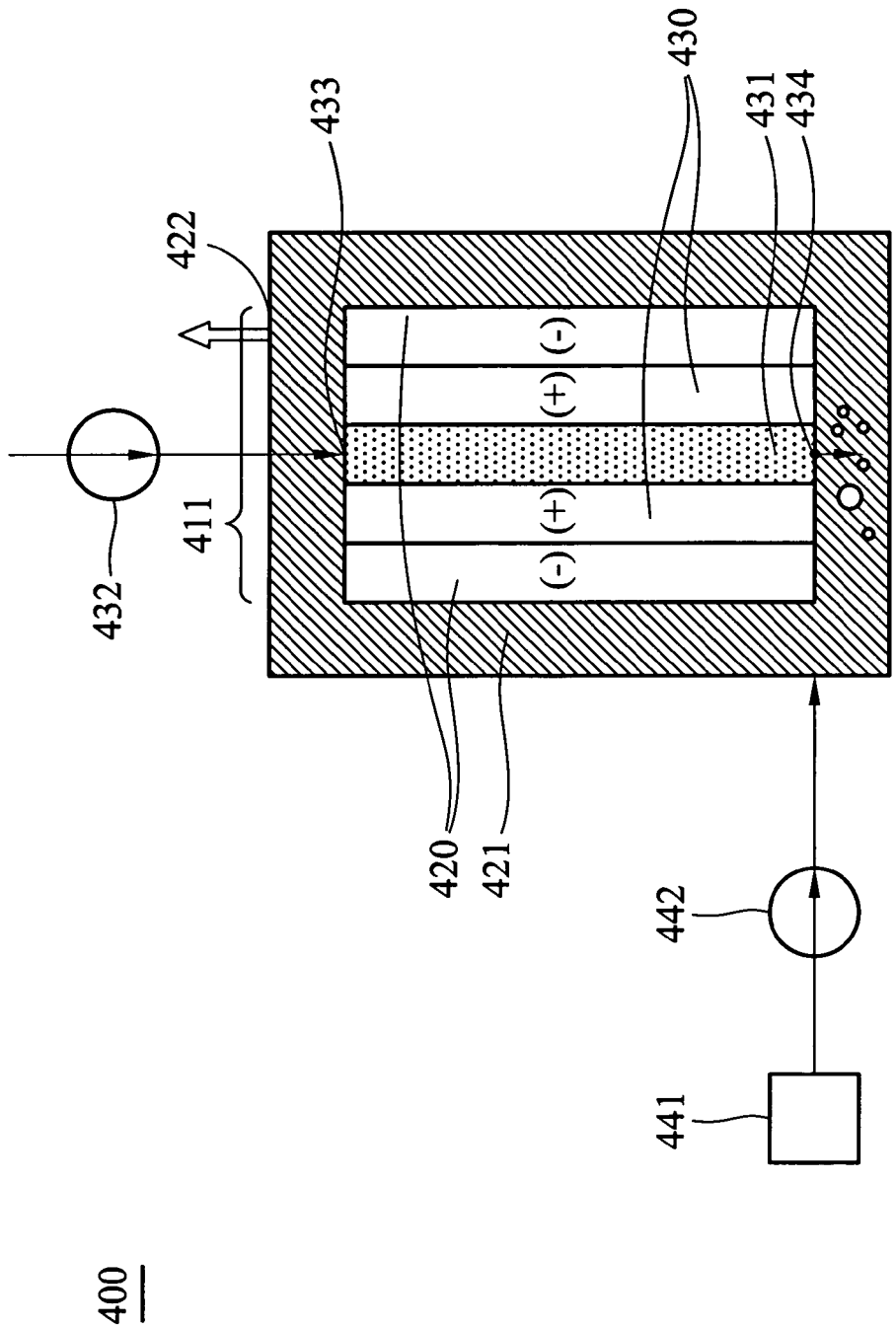
FIG. 4 is a block diagram of a fuel cell system according to a second embodiment of the invention.

FIG. 4 is a block diagram of a fuel cell system 400 according to a second embodiment of the invention. Fuel cell module 411 comprises at least two anodes 420 and cathodes 430 constituting two membrane electrode assemblies (MEAs) located in an anode fuel supply unit 421. The two anodes 420 are disposed on the outside of the fuel cell module and directly contact the anode fuel supply unit 421. The two cathodes 430 are disposed inside the fuel cell module 411 and comprise a cathode gas supply unit 431 containing the gas required for the reaction. The cathode gas supply unit 431 comprises a gas input port 433 and a gas exit 434. The gas required for the reaction is provided by a gas delivery unit 432 coupled to the gas input port 433, such as an air compressor, a steel cylinder with high-pressure gas, a blower, a pump and so on. The gas enters the cathode gas supply unit 431 via the gas input port 433 and exhausts via the gas exit 434. More than one gas exit 434 to the anode fuel supply unit 421 can be implemented in the anode fuel supply unit 421 for better reaction. Gas exit 434 further comprises a porous material for generating fine air bubbles for better reaction in the fuel supply unit 421 and stirring the fuel for even fuel concentration. The fuel supply unit 421 further comprises an anode gas exit 422 to exhaust the gas generated by the reaction in the anode and the gas from the cathode.

The anode gas exit 422 comprises a membrane passing only air and keeps the fuel in anode fuel supply unit 421 for preventing fuel leakage and exhausting gas. A fuel tank 441 storing high concentration fuel is coupled to the anode fuel supply unit 421, wherein fuel concentration in anode fuel supply unit 421 can be adjusted by delivering the high concentration fuel to anode fuel supply unit 421 through the pump 442.

The cathode gas supply unit 431 can comprise a humidity detector for measuring humidity within cathode gas supply unit 431 for controlling the speed of gas delivery into cathode gas supply unit 431.

The surface of anode 420 within the anode fuel supply unit 421 is further covered with a porous material layer to allow passage of the fuel but prevent air contacting the anode 420 directly, wherein the porous material preferably comprises a hydrophilic material.

A porous device, such as an air stone, a gas-passage film, a gas obstructing device or a gas-pass-only device, built into the anode fuel supply unit 421 increases contacting surface areas of the cathode gas and the fuel and detains the cathode gas for longer time for a better reaction between the cathode gas and the fuel.

A no-return valve built in the gas exit 434 prevents the fuel from the anode fuel supply unit 421 return to the cathode gas supply unit 431.

At least one anode gas exit 422 is disposed at a different location in the anode fuel supply unit 421 to rapidly exhaust the gas.

The gas input port 433 of the cathode gas supply unit 431 further comprises a control valve to stop receiving the gas when the fuel cell system is not in operation.

Figure 5:
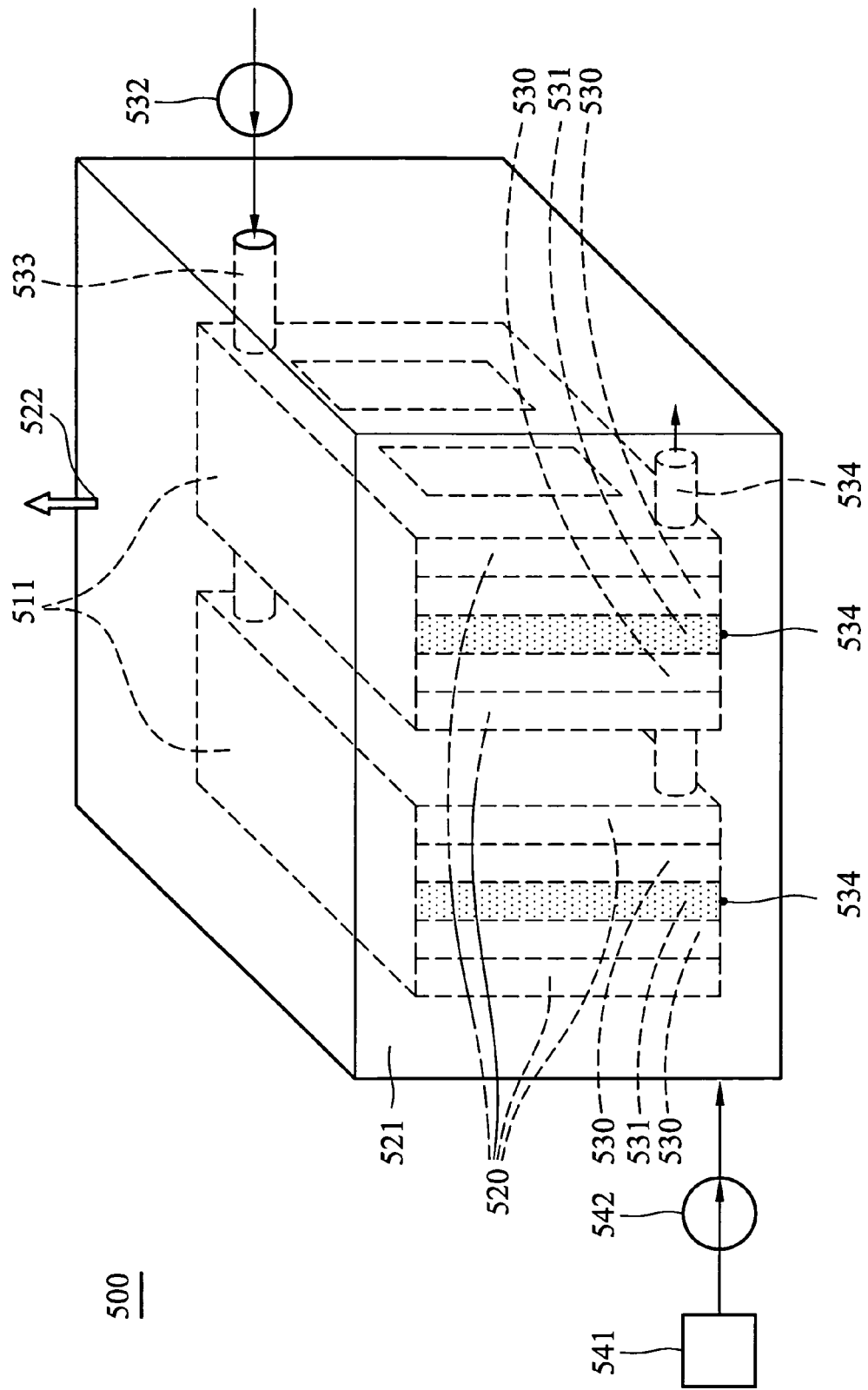
FIG. 5 is a block diagram of a fuel cell system according to a third embodiment of the invention.

FIG. 5 is a block diagram of a fuel cell system 500 according to a third embodiment of the invention. Fuel cell system 500 comprises a plurality of fuel cell module 511, wherein each anode 520 is disposed on the exterior of each fuel cell module 511 and directly contacts the anode fuel supply unit 521 and each cathode 530 is disposed in inside each fuel cell module 511 and comprises a cathode gas supply unit 531 containing the gas required for the reaction. Each cathode gas supply unit 531 is connected to the gas delivery unit 532 via the gas input port 533.

The gas required for the reaction is provided by a gas delivery unit 532 coupled to the gas input port 533, such as an air compressor, a steel cylinder with high-pressure gas, a blower, a pump and so on. The gas enters the cathode gas supply unit 531 via the gas input port 533 and exhausts via the gas exit 534. More than one gas exit 534 to the anode fuel supply unit 521 can be implemented in the anode fuel supply unit 521 for better reaction. Gas exit 534 further comprises a porous material for generating fine air bubbles for better reaction in the fuel supply unit 521 and stirring the fuel for even fuel concentration. The fuel supply unit 521 further comprises an anode gas exit 522 to exhaust the gas generated by the reaction in anode and the gas from the cathode.

The anode gas exit 522 comprises a membrane passing only air and keeps the fuel in anode fuel supply unit 521 for preventing fuel leakage and exhausting gas. A fuel tank 541 storing high concentration fuel is coupled to anode fuel supply unit 521, wherein the fuel concentration in anode fuel supply unit 521 can be adjusted by delivering the high concentration fuel to anode fuel supply unit 521 from a fuel tank 541 by the pump 542.

The cathode gas supply unit 531 can comprise a humidity detector for measuring humidity within cathode gas supply unit 531 for controlling the speed of gas delivery into cathode gas supply unit 531.

The surface of anode 520 within the anode fuel supply unit 521 is further covered with a porous material layer to allow the passage of fuel but preventing air to contact the anode 520 directly, wherein the porous material prefers comprising a hydrophilic material.

A porous device, such as an air stone, a gas-passage film, a gas obstructing device or a gas-pass-only device, built into the anode fuel supply unit 521 increases the contact surface areas of the cathode gas and the fuel and detains the cathode gas for longer time for a better reaction between the cathode gas and the fuel.

A no-return valve built in the gas exit 534 prevents the fuel from the anode fuel supply unit 521 return to the cathode gas supply unit 531.

At least one anode gas exit 522 is disposed in different location of the anode fuel supply unit 521 to rapidly exhaust the gas.

The gas input port 533 of the cathode gas supply unit 531 further comprises a control valve to stop receiving the gas when the fuel cell system is not in operation.

According to the fuel cell system of the invention, when the gas from the cathode gas supply unit enters the anode fuel supply unit, the gas contacts the fuel, and the water contained by the air can stay in the fuel and be directly recycled to the anode fuel supply unit, thus the high concentration fuel can be applied to the anode fuel supply unit. Compared with the conventional fuel cell system, the fuel cell system of the invention reduces the size of a buffer required for storage of the recycling water and a pump for delivery of the fuel to the anode. Thus, the fuel cell system of the invention can reduce power consumption and the cost of the pump and provide a compact design.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fuel cell system comprising:
a fuel cell module comprising at least one fuel cell, wherein the fuel cell has one anode, one cathode, and an electrolyte separation membrane separating the anode and the cathode; at least one cathode gas supply unit in contact with the cathode comprising at least one gas input port for receiving cathode gas and at least one gas exit for exhausting the cathode gas; at least one gas delivery unit to guide the cathode gas to the gas input port of the cathode gas supply unit; and
at least one anode fuel supply unit in direct contact with the anode and having a fuel, wherein the anode fuel supply unit receives the cathode gas exhausted from the gas exit of the cathode gas supply unit and comprises at least one fuel input port for receiving a resupplied fuel, wherein the anode fuel supply unit does not comprise a pump; further comprising a porous device built in the anode fuel supply unit and in contact with the cathode gas supply unit via the gas exit so as to increase the contact surface areas of the cathode gas and the fuel; and wherein surface of the anode is covered with a barrier layer allowing fuel but preventing air to contact the anode directly.

2. The fuel cell system as claimed in claim 1, further comprising a fuel supply system coupled to the fuel input port to provide the resupplied fuel.

3. The fuel cell system as claimed in claim 1, wherein the porous device is made of a porous material to generate fine gas bubbles.

4. The fuel cell system as claimed in claim 1, wherein the fuel cell module comprises at least two membrane electrode assembly cells, and the cathode gas supply unit is deployed between cathodes of the cells and shared by the cathodes of the cells.

5. The fuel cell system as claimed in claim 1, wherein the anode fuel supply unit comprises a no-return valve for preventing the fuel return to the cathode gas supply unit.

6. The fuel cell system as claimed in claim 1, wherein the anode fuel supply unit comprises at least one anode gas exit for exhausting gas.

7. The fuel cell system as claimed in claim 6, wherein the anode gas exit comprises a membrane passing only air and keeps the fuel in the anode fuel supply unit.

8. The fuel cell system as claimed in claim 1, further comprising a control valve built in each gas input port of the cathode gas supply unit to stop receiving the gas when the fuel cell system is not in operation.

9. The fuel cell system as claimed in claim 1, wherein the gas delivery unit delivers the cathode gas to the cathode gas supply unit at a predetermined speed.

10. The fuel cell system as claimed in claim 9, wherein the cathode gas supply unit comprises a humidity detector measuring humidity within the cathode gas supply unit for controlling the amount of cathode gas passing into the cathode gas supply unit via the gas delivery unit.

11. The fuel cell system as claimed in claim 1, wherein the anode fuel supply unit further comprises an anode gas input port, and the gas delivery unit is coupled between the gas exit of the cathode gas supply unit and the anode gas input port to guide the cathode gas to be sucked in the gas input port of the cathode gas supply unit and to deliver the cathode gas, exhausted from the gas exit of the cathode gas supply unit, to the anode gas input port.

12. The fuel cell system as claimed in claim 1, wherein the anode fuel supply unit does not comprise a bipolar graphite flow field plate.

13. A method of recycling water for a fuel cell system of claim 1, guiding the cathode gas to the fuel of the anode fuel supply unit of the fuel cell system directly as the cathode gas passes through the cathode of the fuel cell system.

14. The method as claimed in claim 13, further comprising increasing contacting surface areas of the air and the fuel by a porous device built in the anode fuel supply unit, wherein the porous device further detain the cathode gas for a longer time for a better reaction between the cathode gas and the fuel.

15. The method as claimed in claim 14, wherein the porous device is made of a porous material to generate fine gas bubbles.

* * * * *